United States Patent [19]
Shumaker, Jr. et al.

[11] Patent Number: 5,492,750
[45] Date of Patent: Feb. 20, 1996

[54] MASK FOR COATED GLASS

[75] Inventors: Robert T. Shumaker, Jr., Manorville; Peter T. Dishart, Pittsburgh; Randy R. Kadunce, New Kensington, all of Pa.

[73] Assignee: PPG Industries, Inc., Pittsburgh, Pa.

[21] Appl. No.: 312,175

[22] Filed: Sep. 26, 1994

[51] Int. Cl.⁶ .................................................. B32B 23/02
[52] U.S. Cl. .......................... 428/192; 118/504; 118/505; 421/259; 421/282; 428/195
[58] Field of Search ...................................... 118/301, 504, 118/503, 505; 427/259, 282; 428/192, 195

[56] References Cited

U.S. PATENT DOCUMENTS

| | | | |
|---|---|---|---|
| 4,195,590 | 4/1980 | Herrington | 118/505 |
| 4,477,486 | 10/1984 | Boaz | 427/54.1 |
| 4,759,959 | 7/1988 | Guy | 427/282 |
| 4,815,198 | 3/1989 | Ramus | 29/611 |
| 4,820,902 | 4/1989 | Gillery | 219/203 |
| 4,849,766 | 7/1989 | Inaba et al. | 343/713 |
| 4,898,758 | 2/1990 | Lipson | 118/504 X |
| 4,898,789 | 2/1990 | Finley | 428/623 |
| 5,044,312 | 9/1991 | Guenther et al. | 118/503 X |
| 5,083,135 | 1/1992 | Nagy et al. | 343/713 |
| 5,178,913 | 1/1993 | Kusunoki et al. | 118/504 X |
| 5,316,897 | 5/1994 | Shafir | 430/397 |

Primary Examiner—Michael Lusignan
Attorney, Agent, or Firm—Andrew C. Siminerio

[57] ABSTRACT

The present invention provides a reusable mask to be used in a coating operation to cover selected portions of a substrate from being coated and minimize ghosting about the periphery of the coating. The mask includes first member having a configuration which generally approximates the area of the substrate to be covered and an edge portion which closely follows the desired peripheral shape of said coating, and a second member underlying at least a portion of the first member and having an edge portion which precisely corresponds to the desired peripheral shape of the coating. In one particular embodiment of the invention, the edge portion of the second member is no greater than 0.030 inches thick, and preferably no greater than 0.010 inches thick to minimize any ghosting of the coating about its periphery caused by the second member. In addition, the distance between the edge portions is sufficient to eliminate any shading of the coating about its periphery caused by the first member.

19 Claims, 1 Drawing Sheet

MASK FOR COATED GLASS

The present invention relates to a coating mask and more particularly to a reusable mask used to prevent selected portions of a glass transparency from being coated with a transparent film and improve the appearance of the coating.

Recent advances in automotive technology have resulted in novel multifunctional uses for vehicle transparencies. More specifically, windshields has been designed to incorporate heating arrangements, as disclosed in U.S. Pat. No. 4,820,902 to Gillery, and antenna systems, as disclosed in U.S. Pat. No. 4,849,766 to Inaba et al. and U.S. Pat. No. 5,083,135 to Nagy et al. These developments use a transparent metallic coating applied to selected portions of a major surface of the windshield glass in specific patterns. The coating may be applied using techniques well known in the art, e.g. physical vapor deposition techniques which includes magnetic sputtering vacuum deposition (MSVD), and chemical vapor deposition techniques. One method used to form these patterns is to use tape to outline the desired coating configuration and protect selected portions of the glass sheets from being coated by the film. However, this procedure is time-consuming and labor intensive in both applying the tape before coating and removing the tape after coating. In addition, the tape cannot be reused and must be discarded after each use.

U.S. Pat. No. 4,815,198 to Ramus discloses a snap-on mask to cover a portion of a power lead for an electrically heated transparency to prevent shorting of an electrically conductive coating by adjacent power leads and further to ensure the desired electrical power distribution to the coating. With this type of mask configuration, the mask may tend to shade the glass along the coating/mask interface, resulting in an observable change in the coloration of the coating. This condition is referred to as "ghosting" and is generally undesirable. This ghosting effect may be reduced by reducing the thickness of the mask but as thickness is reduced, the rigidity of the mask is also reduced, resulting in increased difficulty in handling the mask. In addition, if the mask becomes too thin, it may be too light in weight to lay flush against the surface of the substrate, resulting in a poor quality edge outlining the coating. Furthermore, the mask may be too flimsy to be cleaned and reused in subsequent masking operations.

It would be advantageous to have a reusable mask design that would cover at least a substantial portion of the periphery of the glass sheet minimize ghosting along the periphery of the coating.

SUMMARY OF THE INVENTION

The present invention provides a reusable mask to be used in a coating operation to cover selected portions of a substrate from being coated and minimize ghosting of the coating about its periphery. The mask includes first member having a configuration which generally approximates the area of the substrate to be covered and an edge portion which closely follows the desired peripheral shape of said coating, and a second member underlying at least a portion of the first member and having an edge portion which precisely corresponds to the desired peripheral shape of the coating. In one particular embodiment of the invention, the edge portion of the second member is no greater than 0.030 inches thick, and preferably no greater than 0.010 inches thick to minimize any of the coating about its periphery caused by the second member. In addition, the distance between the edge portions is sufficient to eliminate any ghosting of the coating about its periphery caused by the first member.

DETAILED DESCRIPTION OF THE INVENTION

Figure 1:
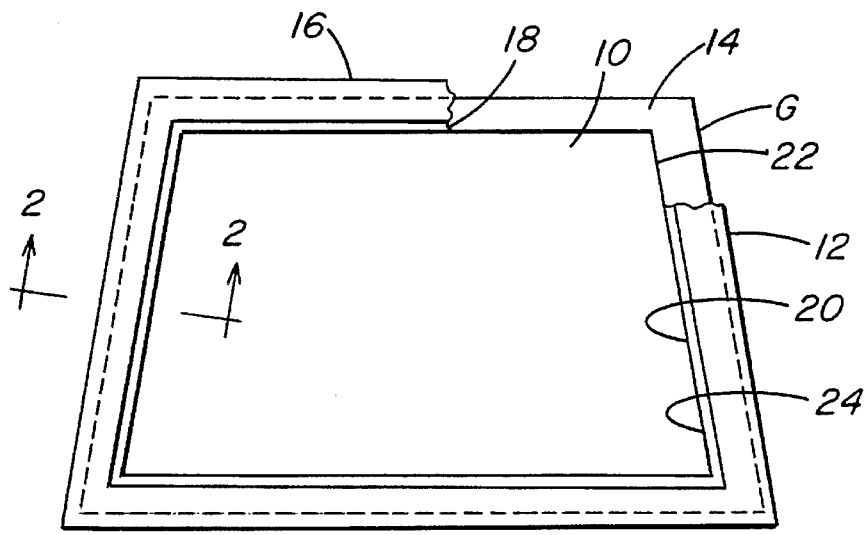
FIG. 1 is a cut-away plan view of a coated glass sheet and a deletion mask incorporating the novel features of the present invention.

FIG. 1 illustrates a glass sheet G with a transparent coating 10 applied to selected portions of the sheet G. Although as shown in FIG. 1, mask 12 is used to cover portions of a flat glass sheet, it should be appreciated that mask 12 may also be curved to match and mask selected portions of a shaped glass sheet. In addition, mask 12 may be used to mask other substrate materials. The shape of the coated area may be varied depending on the desired final use of the coated product. For example, in automotive applications, the glass sheet may be a side or rear window or one of two plies used in an automotive windshield, with the coating being provided to improve the solar performance of the transparency. The coated glass sheet may incorporate bus bars and leads to form an electrically heatable transparency. The coated glass sheet G may also include electrical connectors of a type that would allow the coated sheet G to function as an antenna in an automobile or the like. The pattern of the coating may be modified to provide a radio, television, portable positioning system or other type of antenna systems. The present invention may also be used to produce architectural panels having specific coating patterns.

Referring to FIG. 1, coating 10 may be any type of coating, for example, a transparent multi-layered metallic coating as disclosed in U.S. Pat. No. 4,898,789 to Finley which is applied by magnetic sputtering vacuum deposition techniques which are well known in the art. Mask 12, which is the object of the present invention, is used to cover selected portions of a major surface 14 of the glass sheet G about its periphery so that the coating 10 is applied in the predetermined pattern. Although the mask shown in FIG. 1 is used to coat the central portion of a substrate while leaving the edge portions uncoated, it should be appreciated that the shape of the coating and the corresponding shape of the mask could be any desired configuration. For example, the mask may be used to form a coating with a series of slots or the mask may be used to cover an interior portion of a substrate while allowing the coating to extend to the edges of the substrate.

Figure 2:
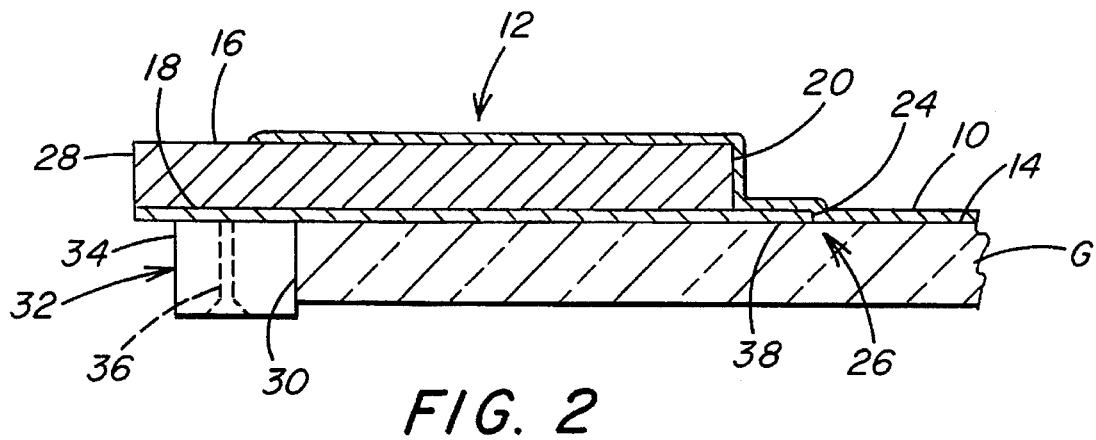
FIG. 2 is a cross-sectional view taken along line 2—2 of FIG. 1.

Referring to FIG. 2, mask 12 includes a first member 16 secured to a second member 18. Member 16 is cut to a shape which generally approximates the area of the glass sheet to be covered. In the particular embodiment disclosed in FIG. 2, the inner edge 20 of member 16 closely follows the desired periphery 22 of coating 10. Member 16 is generally heavier and more rigid than member 18 to maintain the shape of the mask and hold it in place during coating as will be discussed later in more detail. Member 18 is a thin member secured to member 16 in any convenient manner, for example, adhesives, soldering, tape, etc. Edge 24 of member 18 extends inwardly beyond edge 20 of member 16 and precisely corresponds to the desired periphery 22 of coating 10. The bottom surface of member 18 is configured to lay flush against a corresponding portion of surface 14 of sheet G. The thickness requirements for members 16 and 18 will be discussed later in more detail.

In selecting materials for the mask 12 and the means by which members 16 and 18 are held together, care must be taken to avoid materials that would adversely effect the coating operation. More particularly, in an MSVD coating system, the coating layers are deposited on the glass sheet G while in the vacuum chamber and under high temperatures. When in the vacuum chamber, gases may be drawn out of the mask materials, typically referred to as "outgassing", which may effect the coating and result in a nonuniform and/or nonfunctional coating 10.

Members 16 and 18 may be fabricated from a variety of materials, for example, metal such as steel, copper, aluminum; plastics such as polycarbonate and fluorinated ethylene-propylene (FEP) or a combination of both. In a situation where the periphery 22 of a coating 10 which is applied under high temperature conditions, will be visible to an observer, e.g. when the coating edge 22 is not obscured by other material on the surface 14 of the glass G such as a ceramic paint band, or covered by windshield attachment hardware and/or decorative molding, stainless steel is preferred because its coefficient of thermal expansion more closely matches that of the glass. With the other materials, the mismatch of the coefficient results in movement of edge 24 of member 18 relative to the glass G. This movement effects the uniformity of the coating 10 about its periphery 22 that there is not a clean edge. In addition, the weight of the stainless steel keeps edge 24 flush against the glass surface 14.

It has been found that the thickness of member 18 at edge 24 affects the appearance of the periphery 22 of coating 10. More specifically and in particular with physical vapor deposition techniques such as an MSVD coating operation, the thickness of the coating 10 is reduced in the area 26 immediately adjacent the edge 24 due in part to coating material, which would normally be deposited on the glass in area 26, instead being shaded by member 18 and deposited on mask 12. The shading of area 26 by member 18, which is referred to as "ghosting", results in a change in the coating 10 appearance about its periphery 22. This condition is particularly important where the periphery 22 of the coating 10 is visible in the final product as discussed above where it is desirable not to highlight the coating periphery. As a result, the width of area 26 is preferably minimized. In particular, it is preferred that the width of area 26 be no greater than 0.005 inches (0.127 mm) and more preferably no greater than 0.0025 inches (0.0635 mm).

To correlate the relationship between the thickness of member 18 along edge 24 and the width of area 26, a series of tests were performed using various member 18 thicknesses to mask a glass sheet being coated with a multilayered coating of the type disclosed in U.S. Pat. No. 4,898,789 and applied by an MSVD operation. It was observed that the width of area 26 narrows as the edge 24 thickness decreases. In particular, with an edge 24 thickness of 0.03 inches (0.762 mm) the width of area 26 is approximately 0.005 inches (0.127 mm) and at an edge 24 thickness of 0.01 inches (0.254 mm) and less the ghost width in area 26 is no greater than approximately 0.0025 inches (0.0635 mm). It was noted that further reductions in the thickness of member 18 at edge 24 produced only marginal further reductions in the width of area 26.

In one particular embodiment of the invention, member 16 is a 0.090 inch (2.286 mm) thick 304 stainless steel member and member 18 is a 0.010 inch (0.254 mm) thick 304 stainless steel member. The width of the mask varied depending on the desired width of the area to be covered by the mask. The members are bonded together by double-sided tape. The outer edge 28 of the mask 12 extends slightly beyond the peripheral edge 30 of the glass sheet G and edge 24 of member 18 extends 0.125 inches (3.175 mm) inwardly beyond edge 20 of member 16. The combined weight of members 16 and 18 comprising the mask 10 is sufficient to hold the mask 12 flat against surface 14 of sheet G.. As an alternative, if the mask 12 is too light due to the materials used for construction and/or the size of the mask, a clip arrangement (not shown) may be used to positively secure the mask 12 to the sheet G. The selected material and thicknesses of the members also provides the necessary rigidity for handling the mask.

If required, a series of adjustable alignment cams 32 may be positioned at selected portions about the mask 12. Referring to FIG. 2, the cams 32 include an eccentrically mounted wound nylon washer 34, which may be rotated as required about screw connector 36 to properly position the mask 12 on glass sheet G and hold it in place during a coating operation.

With the type of mask configuration shown in FIGS. 1 and 2 and disclosed above, the mask has sufficient rigidity to be easily handled, reused and if required, cleaned, while still allowing only minimal ghosting about the periphery 22 of coating 10.

Figure 3:
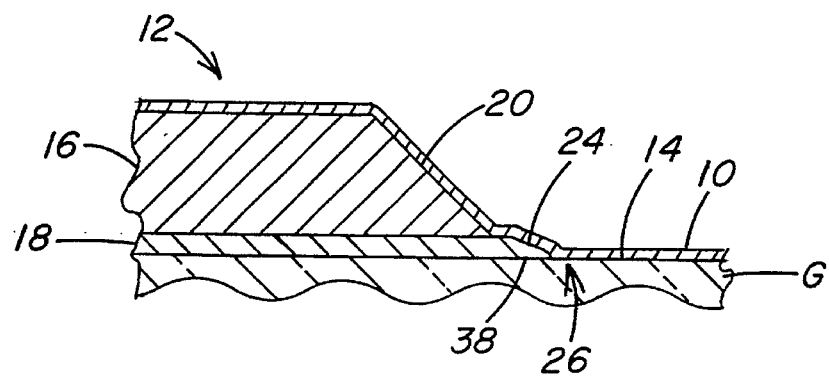
FIG. 3 is a partial cross-sectional view similar to FIG. 2 incorporating features of an alternate embodiment of the invention.

Edge 24 may be beveled as shown in FIG. 3 to reduce the thickness of this edge in an effort to further reduce the width of area 26, but as discussed earlier, it is expected that any the reduction in the width of area 26 would be marginal. In addition, if edge 24 is beveled to provide an edge 24 thickness less than 0.01 inches, due to the resulting reduced strength, the edge will be more susceptible to marking or bending. As a result, the edge 24 may not lay flat on surface 14 of glass sheet G and portions of coating 10 may be deposited under the mask 12.

It was observed that the width of section 38 of member 18, i.e. the distance edge 24 of member 18 is spaced from edge 20 of member 16, and the thickness of member 16 may also effect the width of ghosting in area 26. More particularly, if edge 24 is too close to member 16, the latter may shade the coating 10 about its periphery as discussed earlier and increase the width of area 26. In the particular embodiment of the invention discussed above where member 16 was 0.090 inches (2.286 mm) thick, it was found that a section 38 width of the 0.0625 inches (1.5875 mm) increased the width of ghosting area 26 while this ghosting area width was not effected for section 38 widths of 0.125 and 0.25 inches (3.175 and 6.35 mm). It is expected that if the thickness of member 16 increases, the distance between edges 20 and 24 may have to increase and similarly, if the thickness of member 16 decreases, it may be possible to decrease the distance between edges 20 and 24. It should be appreciated however that this distance is preferably minimized to maintain the rigidity of section 38 of member 18. If desired, the rigidity of section 38 may be increased by using a thicker plate for member 18 and tapering section 38 down to a thickness of 0.01 inches along edge 24.

As an alternative to increasing the width of section 38 of member 18 if the thickness of member 16 is increased, edge 20 of member 16 may be beveled as shown in FIG. 3 to control ghosting about the periphery 22 of coating 10.

The invention described and illustrated herein represents a description of illustrative preferred embodiments thereof.

It is understood that various changes may be made without departing from the gist of the invention defined in the claims set to follow.

We claim:

1. A mask to prevent selected portions of a glass substrate from being coated with a transparent coating so as to provide a desired coating shape on said substrate and reduce ghosting along a peripheral edge of said coating, comprising:

a first member having a configuration which generally covers a substantial area of said selected portions of said substrate and has an edge portion which closely follows said desired shape of said coating; and a second member extending beyond said first member edge portion and covering a remaining area of said selected portions along said peripheral edge of said coating, said second member having an edge portion which precisely corresponds to said desired shape of said coating, wherein said first member is more rigid than said second member and said edge portion of said second member has a thickness of no greater than 0.030 inches thick to reduce ghosting of said coating's peripheral edge by said second member and is spaced from said first member edge portion a sufficient distance to eliminate ghosting of said coating's peripheral edge by said first member.

2. The mask as in claim 1 wherein said first and second members are stainless steel.

3. The mask as in claim 1 wherein said second member extends beneath at least of portion of said first member.

4. The mask as in claim 1 wherein said edge portion of said second member is no greater than 0.010 inches thick.

5. The mask as in claim 1 wherein said first member has a thickness along said first member edge portion which is greater than said second member edge portion thickness.

6. The mask as in claim 1 wherein said distance between said first member edge portion and said second member edge portion is at least 0.125 inches.

7. The mask as in claim 1 wherein said first and second members are curved to generally correspond to surface contours of a nonplanar substrate.

8. The mask as in claim 5, wherein said first member edge portion is beveled to reduce said thickness along said first member edge portion.

9. The mask as in claim 5, wherein said second member edge portion is beveled to reduce said thickness along said second member edge portion.

10. The mask as in claim 1 further including a plurality of alignment members secured to selected ones of said members to position said mask on said substrate.

11. The mask as in claim 1 wherein said mask extends around the complete periphery of said substrate.

12. A mask to prevent selected areas of a glass substrate from being coated with a transparent coating so as to provide a desired coating shape on said substrate and reduce ghosting along a peripheral edge of said coating, comprising:

a first section having a configuration which covers a portion of said selected areas of said substrate which is not to be covered and has an outline which closely follows said desired shape of said coating; and a second section extending beyond said outline of said first section and covering a remaining portion of said selected areas of said substrate which is not to be coated along said peripheral edge of said coating, said second section having an edge portion which precisely corresponds to said desired shape of said coating, wherein said first section is more rigid than said second section and said second section edge portion has a thickness of no greater than 0.030 inches to reduce ghosting of said coating's peripheral edge by said second section and said outline of said first section is spaced from said second member edge portion a sufficient distance to eliminate ghosting of said peripheral edge of said coating by said first section.

13. In a method of applying a transparent coating to a glass substrate including the steps of covering selected portions of said substrate with a mask having an edge with a configuration corresponding to a desired coating shape and coating said substrate, wherein said mask edge shades said coating along its periphery and causes ghosting of said coating along said periphery, the improvement comprising:

covering said selected portions of said substrate with a mask having a first section with a configuration that generally covers at least a substantial portion of said substrate which is not to be covered and has an outline which closely follows said desired coating shape;

extending a second section of said mask beyond said outline of said first section to cover a portion of said substrate which is not to be coated along said coating periphery;

positioning an edge portion of said second section along said coating periphery; and spacing said second edge portion a sufficient distance from said first member outline to eliminate ghosting of said coating periphery by said first section.

14. The method as in claim 13 wherein said shaping step includes the step of spacing said second section edge portion at least 0.125 inches from said first section outline.

15. The method as in claim 13 wherein said substrate has a curved configuration and further including the step of curving said first and second sections to match said curvature of said substrate at said selected portions.

16. The method as in claim 13 further including the step of beveling said first section along said outline.

17. The method as in claim 13 further including the step of beveling said second section along said edge portion.

18. The method as in claim 13 further including the step of providing said second section with a thickness along said edge portion of no greater than 0.030 inches.

19. The method as in claim 18 further including the step of providing said second section with a thickness along said edge portion of no greater than 0.010 inches.

* * * * *